(12) United States Patent
Yamaoka et al.

(10) Patent No.: US 8,667,695 B2
(45) Date of Patent: Mar. 11, 2014

(54) WORK HEAD FOR A ROTATIONAL BRUSH CUTTER

(75) Inventors: Toshinari Yamaoka, Nanjing (CN); Fangjie Nie, Jiangning District (CN); Chao Meng, Jianye District (CN)

(73) Assignee: Chervon (HK) Limited, Wanchai (HK)

( * ) Notice: Subject to any disclaimer, the term of this patent is extended or adjusted under 35 U.S.C. 154(b) by 241 days.

(21) Appl. No.: 13/163,841

(22) Filed: Jun. 20, 2011

(65) Prior Publication Data

US 2011/0314681 A1 Dec. 29, 2011

(30) Foreign Application Priority Data

Jun. 24, 2010 (CN) .......................... 2010 1 0213397

(51) Int. Cl.
 *B26B 7/00* (2006.01)
(52) U.S. Cl.
 USPC ................................. 30/276; 30/329; 30/347
(58) Field of Classification Search
 USPC ............. 30/276, 347, 275.4, 288, 329, 277.4; 56/12.7
 See application file for complete search history.

(56) References Cited

U.S. PATENT DOCUMENTS

| | | | | | |
|---|---|---|---|---|---|
| 4,825,627 | A | * | 5/1989 | Truderung | 56/12.7 |
| 5,852,876 | A | * | 12/1998 | Wang | 30/276 |
| 6,052,907 | A | * | 4/2000 | Wang | 30/276 |
| 6,112,416 | A | * | 9/2000 | Bridges et al. | 30/276 |
| 6,249,978 | B1 | * | 6/2001 | Sheldon | 30/276 |
| 6,427,341 | B1 | * | 8/2002 | Lee | 30/347 |
| 6,912,789 | B2 | * | 7/2005 | Price, III | 30/276 |
| 7,603,782 | B2 | * | 10/2009 | Jerez | 30/276 |
| 7,743,511 | B2 | * | 6/2010 | Jerez | 30/276 |
| 7,878,097 | B2 | * | 2/2011 | Strader | 83/13 |
| 7,913,401 | B2 | * | 3/2011 | Iacona | 30/275.4 |
| 8,307,558 | B2 | * | 11/2012 | Alliss | 30/276 |
| 2001/0027610 | A1 | * | 10/2001 | Wheeler et al. | 30/276 |
| 2004/0148785 | A1 | * | 8/2004 | Price, III | 30/276 |
| 2006/0053636 | A1 | * | 3/2006 | Fogle | 30/276 |
| 2007/0028458 | A1 | * | 2/2007 | Guerra | 30/276 |
| 2007/0180706 | A1 | * | 8/2007 | Guerra | 30/276 |
| 2008/0010836 | A1 | | 1/2008 | Iacona | |
| 2008/0282552 | A1 | * | 11/2008 | Arnetoli | 30/276 |
| 2009/0038163 | A1 | * | 2/2009 | Jerez et al. | 30/276 |
| 2011/0214295 | A1 | * | 9/2011 | Proulx | 30/276 |

FOREIGN PATENT DOCUMENTS

| | | |
|---|---|---|
| EP | 0 683 969 A1 | 11/1995 |
| EP | 1 446 002 B1 | 7/2007 |

\* cited by examiner

*Primary Examiner* — Omar Flores Sanchez
(74) *Attorney, Agent, or Firm* — McDermott Will & Emery LLP

(57) ABSTRACT

The present application provides a work head for a rotational brush cutter. The work head comprises an upper plate, a lower plate and a blade, the upper plate and the lower plate being fixedly coupled. The lower plate is circular and has a passage therethrough with a gear arranged in the passage. The blade has a body portion and a connection portion with the body portion able to be extended outside of the upper and lower plates. The through passage is designed so that the blade can be replaced without requiring the upper plate and lower plate to be disassembled. As a result, because the blade is not restricted by a narrow space between the upper plate and the main frame, the work head does not need to be removed from the brush cutter to replace the blade thereby saving time and effort.

9 Claims, 3 Drawing Sheets

WORK HEAD FOR A ROTATIONAL BRUSH CUTTER

CROSS-REFERENCE TO RELATED APPLICATIONS

This application claims priority to CN 201010213397.4, filed Jun. 24, 2010, which is hereby incorporated by reference.

FEDERALLY SPONSORED RESEARCH OR DEVELOPMENT

Not Applicable.

TECHNICAL FIELD

The present application relates to a rotational brush cutter, and more particularly, to a work head for a rotational brush cutter.

BACKGROUND OF THE INVENTION

Generally, a rotational cutter refers to a brush cutter, which comprises a work head for cutting shrubs, grass, etc. A traditional work head usually comprises an upper plate, a lower plate and a blade with approximately two to four posts uniformly arranged on the lower plate. The blade is attached to a post via a hole defined on the blade and rotatably connected with the post. A bolt is extended through a bolt hole defined in the upper plate and threadly coupled to the post to provide a fixed connection between the upper plate and the lower plate. The work head is driven by an output shaft of the brush cutter to rotate the work head causing the blade to extend outwardly from the blade-plate under a rotational centrifugal force to cut grass, shrubs, etc.

While cutting shrubs or grass, the blade may become worn and may need to be replaced. By analyzing the structures in the prior art, it has been realized that the upper plate must be removed from the lower plate if the blade needs to be replaced and the method of replacement is very complicated. Specifically, the bolt must be wrenched off with the help of an auxiliary means such as a screwdriver and because the space between the upper plate and the frame of the brush cutter is small, the motion required to wrench the bolt can be interfered with by the frame. As a result, the entire work head usually needs to be removed from the brush cutter first resulting in wasted time and manpower.

SUMMARY OF THE INVENTION

In response to the defects of the prior art, the present application provides a work head for a rotational brush cutter which allows the blade to be replaced rapidly.

Specifically, a work head used for a rotational brush cutter may have an upper plate, a lower plate and a blade. The upper plate and the lower plate may be fixedly connected, where the lower plate is a circular housing with a passage defined therethrough from an inner circular side to an outer circular side and a gear position arranged in the passage. The blade may have a blade body portion and a connection portion, where the blade body portion and the connection portion are arranged on both sides of the gear position respectively. Also, the blade body portion can project beyond the outer circular side.

In addition, a sliding guide groove may be arranged on the housing of the lower plate at its inner circular side and be in lateral communication with the passage. The sliding guide groove may have a first end in communication with the passage and a second end away from the passage, where the first end is deeper and wider than the second end with a smooth transition from the first end to the second end. Also, the second end may bend away from the upper plate along the housing of the lower plate.

Further, a first post and a second post may be arranged on the upper and lower sides of the connection portion respectively. And a slot may be arranged on the upper plate, where the first post is fit for the gear position and the second post is fit for the slot. Both the first post and the second post may have a cylindrical shape, and the length of the slot may be larger than the diameter of the second post.

Also, an elongated cavity for receiving the blade may be arranged at an edge of the outer circular side of the lower plate and a stop rib may be arranged in the cavity.

The following benefits may be achieved by utilizing the technical solutions described herein. The through passage may be arranged on the lower plate such that the blade can be replaced without disassembling the upper plate and the lower plate first. That is, the blade can pass through the inner circular side of the lower plate and extend out from the outer circular side thereof directly without using any auxiliary tool. Also, because the blade is assembled from one side of the lower plate and the operation is not restricted by the space between the upper plate and the main frame, it is unnecessary to remove the work head from the brush cutter so as to save time and effort. Finally, since the elongate cavity is arranged in the edge of the outer circular side of the lower plate, the blade can be received in the cavity so as to advantageously protect the blade and save the placement space when out of use.

BRIEF DESCRIPTION OF THE DRAWINGS

To understand the present application, it will now be described by way of example, with reference to the accompanying drawings in which.

DETAILED DESCRIPTION

Figure 1:
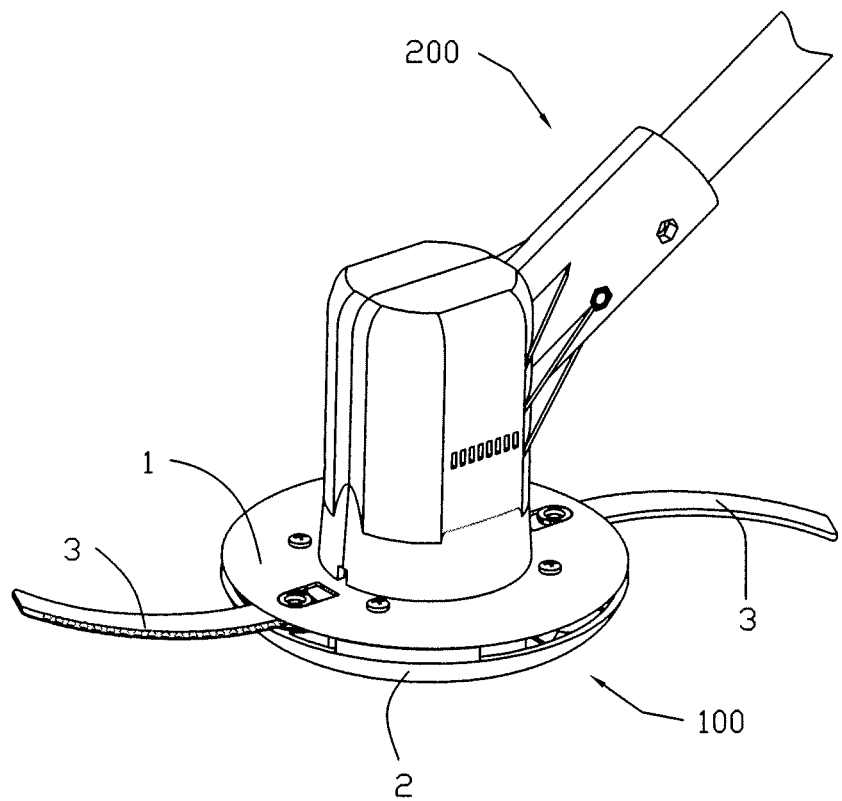
FIG. 1 is a schematic view of a brush cutter with a work head according to one example of the present application.

The present application will be further explained herebelow with reference to the drawings. As shown in FIG. 1, it is a schematic view of a brush cutter with a work head according to an embodiment of the present application. The work head 100 is mounted on an output shaft of a main body 200 of the brush cutter at the front end of the main frame 200 and has a mount plate and a blade 3. The mount plate comprises an upper plate 1 and a lower plate 2, wherein the upper plate 1 and the lower plate 2 are fixedly connected. The blade 3 is mounted between the upper plate 1 and the lower plate 2 with its blade body portion for cutting extending out from the edge between the upper plate 1 and the lower plate 2. When used for cutting, the output shaft of the brush cutter drives the work head to rotate, and the blade rotates beyond the edge of the mount plate due to a rotational centrifugal force and cuts the grass, shrub, etc.

Figure 2:
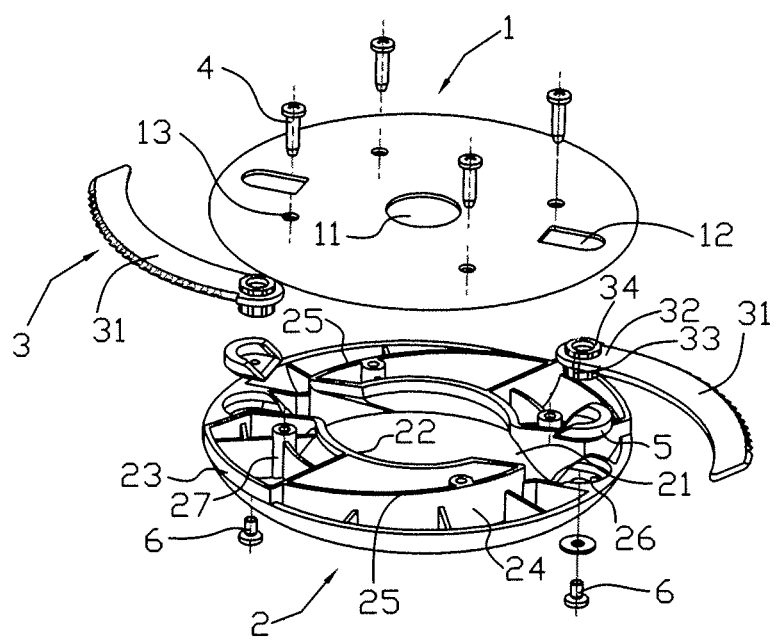
FIG. 2 is an exploded view of the work head according to an example of the present application.
Figure 3:
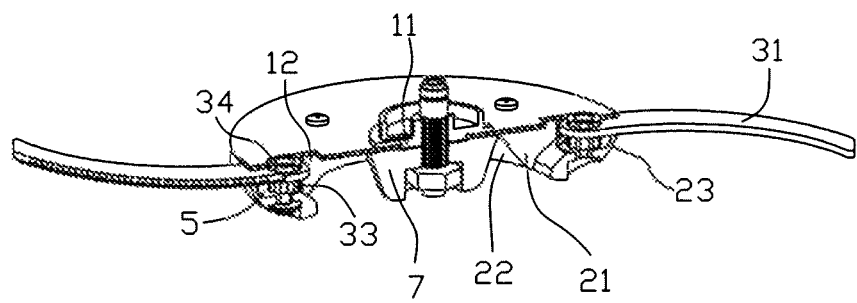
FIG. 3 is a cross-sectional view of the work head shown in FIG. 2.

As shown in FIG. 2 and FIG. 3, they are an exploded view and a half-sectional view of the work head according to the preferred embodiment of the present application, respectively. The upper plate 1 and the lower plate 2 are connected by a bolt 4. More particularly, a bolt hole 13 is defined in the upper plate 1, and a post 27 is arranged on the lower plate 2 corresponding to the position of the bolt hole, and the bolt 4 passes through the bolt hole 13 and is connected to the post 27 using a threaded connection. The upper plate 1 is a metal disc and a central hole 11 is defined in the center of the disc, through which a fastener is passed when the disc is connected with the output shaft of the brush cutter. The lower plate 2 is a circular housing made from hard plastic having an inner circular side 22 and an outer circular side 23. A through passage 21 is arranged on the lower plate 2 from the inner circular side 22 to the outer circular side 23. A gear position 26 is arranged in the passage 21. Preferably, the gear position 26 is provided by the housing of the lower plate on the outer circular side 23, and the blade 3 is a non-metallic blade with a convex-arc shape. Preferably, the blade is made from Nylon. The blade 3 comprises a blade body portion 31 and a connection portion 32. A first post 33 mated with the gear position 26 and a second post 34 mated with a slot 12 on the upper plate are arranged on the upper side and the lower side of the connection portion 32, respectively. In order to enhance the mating strength and increase the wear resistance between the first post 33 and the gear position 26, a metallic aluminum block 5 is fixedly connected to the gear position 26 by a screw 6. The outer side of the aluminum block 5 is engaged with the inner side of the gear position 26 and the inner side of the aluminum block 5 is engaged with the surface of the first post 33. The housing wall of the outer circular side 23 of the lower plate 2 is partially cut away so that an elongated cavity 24 for receiving the blade 3 is defined between the upper and lower plates after the upper plate 1 and the lower plate 2 are fixedly connected together. A stop rib 25 is arranged on the housing of the lower plate 2 in the cavity 24. Therefore, when the brush cutter is not used or the grass cutting is over, the blade 3 can be directly rotated and received in the cavity 24. As a result, the blade can be protected and storage space reduced.

Figure 4:
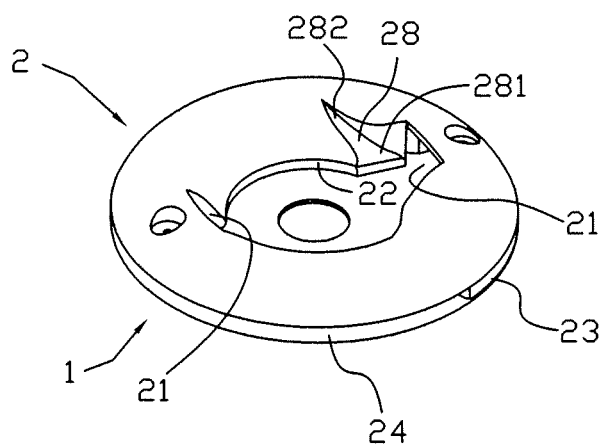
FIG. 4 is a perspective view of the work head shown in FIG. 2.

As shown in FIG. 4, it is a perspective view of the work head according the present application. There are two passages 21 in the present embodiment which are disposed symmetrically. Correspondingly, two blades can be assembled and two cavities 24 for receiving the blades can be provided. It will be known from combining FIG. 5 and FIG. 6 that a sliding guide groove 28 is further arranged on the housing of the inner circular side 22 of the lower plate 2 to prevent the blade 3 from being obstructed by a tightening flange 7 when the blade 3 is assembled. The sliding guide groove 28 is in communication with the passage 21 and comprises a first end 281 in communication with the passage 21 and a second end 282 away from the passage 21. The first end 281 is wide and deep while the second end 282 is tapered and shallow with a smooth transition from the first end 281 to the second end 282, and the second end 282 bends/warps towards the direction away from the upper plate 1 along the housing of the lower plate 2.

Figure 5:
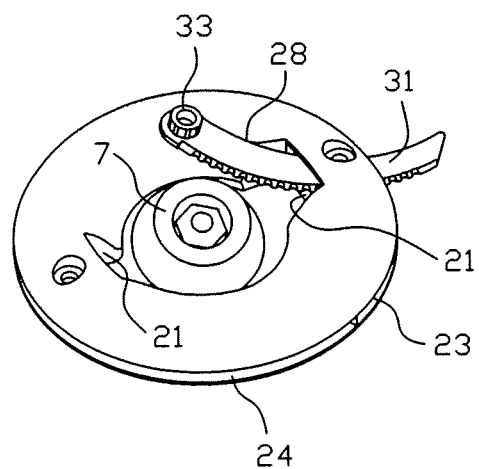
FIG. 5 is a schematic view illustrating the assembly of the blade of the work head, wherein the blade is in an initial state during assembly.
Figure 6:
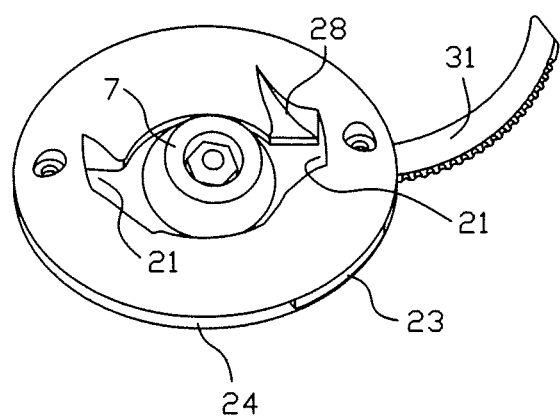
FIG. 6 is a schematic view illustrating the assembly of the blade of the work head, wherein the blade is in the assembled state.

As shown in FIG. 5 and FIG. 6, they are the schematic views illustrating the assembly course of the blade. First, the blade 3 is guided into the passage 21 along the sliding guide groove 28. Then, the blade body portion 31 passes through the passage 21. At last, combined with FIG. 2, the first post 33 and the second post 34 on the upper and lower sides of the connection portion 32 are mated with the aluminum block on the gear position 26 and the slot 12 of the upper plate 1, respectively. At that time, the blade body portion 31 protrudes from the outer circular side 23, and the connection portion 32 is blocked by the gear position 26 and received in the passage 21 near the inner circular side 22. In the present embodiment, preferably, the first post 33 and the second post 34 are cylinders. The sum of the thickness of the blade body portion of the blade 3 and the height of the first post 33 is corresponding to the height of the passage 21. Since the second post 34 is arranged on the other side of the connection portion 32 opposite to the first post 33, in order to enable the second post 34 to pass through the passage 21 and simultaneously mate with the slot 12, the length of the slot 12 is larger than the diameter of the second post 34.

However, to prevent the blade from falling off backward by the brush, the length of the slot must not be too long. The design basis of the slot's length should be that the connection portion 32 just enters into the passage 21 when the blade 3 inclines a little relative to the plane vertical to the output shaft. To dissemble the blade a user merely reverses the above assembly method. As a result, replacing the blade is simpler for the work head of the present application. As a result, the brush cutter in the preferred embodiment is a quick, safe and highly effective brush cutter tool.

The upper plate and the lower plate of the work head used for the rotational brush cutter in the present application also can be made integrally in other embodiments. Additionally, the lower plate is not limited to hard plastic and also can be a metallic part such as a casting part or a stamping part. Finally, the slot defined in the upper plate mated with the second post can also be a blind hole.

What is claimed is:
1. A work head for a rotational brush cutter, comprising:
   an upper plate;
   a lower plate comprising a circular housing having a passage formed in the housing from an inner circular side to an outer circular side, and further comprising a gear arranged in the passage;
   the upper plate and the lower plate being fixedly coupled;
   a sliding guide groove arranged on the inner circular side of the circular housing and in communication with the passage, wherein the sliding guide groove has a first end proximal to the passage and a second end distal of the passage, the first end being deeper and wider than the second end with a transition from the first end to the second end;
   a blade comprising a blade body portion and a connection portion, wherein the blade body portion and the connection portion are arranged on both sides of the gear, the blade body portion being movable to extend out of the outer circular side.
2. The work head for a rotational brush cutter according to claim 1, wherein the second end bends away from the upper plate along the housing of the lower plate.
3. The work head for a rotational brush cutter according to claim 1, wherein a first post and a second post are provided on the upper and lower sides of the connection portion respectively, and a slot is arranged on the upper plate, wherein the first post is designed to fit with the gear and the second post is designed to fit with the slot.
4. The work head for a rotational brush cutter according to claim 3, wherein both the first post and the second post are cylindrical, and the slot has a length longer than the diameter of the second post.

5. The work head for a rotational brush cutter according to claim 1, wherein an elongated cavity for receiving the blade is arranged at an edge of the outer circular side of the lower plate.

6. The work head for a rotational brush cutter according to claim 5, wherein a stop rib is arranged in the cavity.

7. The work head for a rotational brush cutter according to claim 1, wherein the blade is non-metallic.

8. The work head for a rotational brush cutter according to claim 7, wherein the material of the blade is Nylon.

9. The work head for a rotational brush cutter according to claim 1, wherein the lower plate is at least one of a hard plastic part, a stamping part, and a casting part.

* * * * *